United States Patent Office 3,652,727
Patented Mar. 28, 1972

3,652,727
VINYL CHLORIDE SERIES RESIN COMPOSITIONS
Shuzo Yonezu, Nishinomiya, and Takeshi Tanaka, Minoru Tsuzuki, and Takashi Kobayashi, Settsu, Japan, assignors to Kanegafuchi Kagaku-Kogyo Kabushiki-Kaisha, Osaka, Japan
No Drawing. Filed Sept. 29, 1969, Ser. No. 862,068
Claims priority, application Japan, Oct. 15, 1968, 43/75,151
Int. Cl. C08f 29/24, 29/50, 29/56
U.S. Cl. 260—876 R
13 Claims

ABSTRACT OF THE DISCLOSURE

Vinyl chloride series resin compositions particularly excellent in processing property comprise more than 60 parts by weight of vinyl chloride series resins and less than 40 parts by weight of the graft polymers obtained by graft-polymerizing with less than 10 parts by weight of synthetic rubber, 100 parts by weight of monomers consisting of 30–85% by weight of methacrylic esters, 10–60% by weight of vinyl aromatic hydrocarbons and 2–30% by weight acrylonitrile series monomer or more than 80% by weight of these three ingredients and less than 20% by weight of comonomers copolymerizable therewith.

---

The present invention relates to the vinyl chloride series resin compositions.

Because the vinyl chloride resins are thermally decomposed in the neighborhood of their processing temperature, and are in possession of high melt viscosity and in the deficiency of fluidity, they are endowed with a drawback of difficult processing. The methods known for improving the processing property are: addition of plasticizers, copolymerizing other monomers with vinyl chloride, and mixing vinyl chloride resins with other resins (e.g., acrylonitrile-styrene copolymer, methyl methacrylate-styrene copolymer). The effect of improvement in the processing property achieved by these methods, however, is not quite satisfactory, and the molded products obtained are poor in mechanical strength, transparency and surface condition. The lack of high mutual solubility between vinyl chloride resins and other blends may be responsible for this phenomenon.

Where the improvement in impact strength of vinyl chloride resins is desired, it is also known that the compositions excellent in impact strength comprise vinyl chloride resins and graft polymers obtained by graft-polymerizing to synthetic rubbers such monomers as acrylonitrile, styrene, methyl methacrylate, etc., singly or in combination of two or more kinds of them. The graft polymers of this kind for the improvement of impact strength usually have high rubber contents. With high rubber contents, however, these compositions are poor in processing property, heat stability and weather-proof.

The object of this invention is to yield industrially at a profit compositions excellent in processing property without impairing the physical and chemical properties intrinsic to the vinyl chloride resins (transparency, tensile strength, elongation, hardness, heat stability, weather-proof, etc.).

The present invention provides homogeneous vinyl chloride series resin compositions comprising more than 60 parts (by weight, the same applies hereinafter) of vinyl chloride series resins and less than 40 parts of the graft polymers obtained by graft-polymerizing with less than 10 parts of synthetic rubber, 100 parts of monomers consisting of 30–85% (by weight, the same applies hereinafter) of methacrylic ester, 10–60% of vinyl aromatic hydrocarbons and 2–30% of acrylonitrile series monomers or more than 80% of these three ingredients and less than 20% of comonomers copolymerizable therewith. The details may follow.

First, by the vinyl chloride series resins, being one component used in the exercise of this invention, is meant polyvinyl chloride or copolymer of more than 80% of vinyl chloride and one or more kind of comonomers. As the comonomers, for example, vinyl acetate, vinyl propionate, vinylidene chloride, alkyl acrylate, alkyl methacrylate, ankyl vinyl ether and propylene may be mentioned.

The graft polymers, being the other components, are obtained by graft-polymerizing with less than 10 parts of synthetic rubber, 100 parts of monomers consisting of 30–85% of methacrylic esters, 10–60% of vinyl aromatic hydrocarbons and 2–30% of acrylonitrile series monomers or more than 80% of these three ingredients and less than 20% of comonomers.

In this instance, by synthetic rubbers are meant homopolymers of conjugate diolefines (e.g., butadiene, isoprene, chloroprene, etc.) or their copolymers with monoolefinic monomers (a.g., styrene, acrylonitrile, methyl methacrylate, etc.). In the case of copolymers, the conjugate diolefins are used in an amount of more than 50%. When less than 50% is used, their mutual solubilities with the vinyl chloride series resins are unsatisfactory. The synthetic rubbers are used singly or in combination with two or more kinds of these. The amount used is less than 10 parts as against 100 parts of the monomers. When more than this specified amount is used, their mutual solubilities with the vinyl chloride series resins would become low, and the final products would be poor in their processing property, heat stability and weather-proof. These facts are evident from the data of experiments listed in the following Table 1.

TABLE 1

| Experiment number | Rubber | | Roll temperature (° C.) | Gelation time (min.) | Coefficient of transmission of light, ray (600 mμ, percent) | Heat stability (min.) |
|---|---|---|---|---|---|---|
| | Kind | Amount (part) | | | | |
| 1 | | 0 | 155 | 6.0 | 72.5 | 75 |
| 2 | Styrenebutadiene copolymer [1] | 1 | 147.5 | 2.0 | 75.0 | 80 |
| 3 | do | 5 | 140.0 | 1.5 | 77.0 | 75 |
| 4 | do | 10 | 137.5 | 1.5 | 75.5 | 75 |
| 5 | do | 15 | 147.5 | 4.5 | 65.5 | 60 |
| 6 | Polybutadiene | 1 | 145.0 | 2.5 | 76.0 | 75 |
| 7 | do | 5 | 140.0 | 1.5 | 78.0 | 70 |
| 8 | do | 10 | 137.5 | 1.5 | 75.0 | 70 |
| 9 | do | 15 | 145.0 | 4.5 | 63.5 | 55 |

[1] Styrene 23.5%.

NOTES (1) Experiments 1, 5 and 9 are contrasts.

(2) Blends of 5 parts of graft polymers obtained by graft-polymerizing with various amounts (parts) of rubber polymers, 100 parts of monomer consisting of 50% of methyl methacrylate, 40% of styrene and 10% of acrylonitrile; 95 parts of vinyl chloride resin (average polymerization degree 1000, in accordance with JIS (Japanese Industrial Standard)—K6721, the same applies hereinafter); 3 parts of dialkyl tin mercaptide and 1 part of butyl stearate were put to the tests.

(3) Roll temperature: The minimum temperature (° C.) required in producing by kneading the composition on the rolls for 5 min, a sheet which does not break when bent at an angle of 180°. (The same applies to the examples that follow.)

(4) Gelation time: The time (min.) required before the maximum kneading resistance is indicated on the Brabender Plastgraph. Temperature, 165° C. (The same applies to the examples that follow.)

(5) Coefficient of transmission of the light ray: JIS-K6714, the measurements are taken of a test piece 4 mm. thick. The larger the numerals, the better transparency is acquired. (The same applies to the examples that follow.)

(6) Heat stability: The time (min.) required for a sheet to turn in color to brown in an airbath held at 185° C. (The same applies hereinafter.)

Some parts of the compositions which are listed in Table 1 were subjected to the test for weather-proof. The results is set forth in Table 2.

TABLE 2

| Experiment number | Weather-proof, value after irradiation/value before irradiation ×100 | |
|---|---|---|
| | Tensile strength percent | Elongation percent |
| 1 | 112 | 18 |
| 3 | 106 | 30 |
| 4 | 108 | 27 |
| 5 | 117 | 22 |

NOTE

The weather-proof test was carried out by use of the xenon Weather-O-Meter irradiating at 25° C., for 300 hours. The smaller is the value in tensile strength and the larger is the value in the elongation, the better is the weather-proof.

Of the monomers to be graft-polymerized with synthetic rubbers, the methacrylic esters are used in the rate of 30–85% of the total monomers. When they are used outside of this specified amount, the compositions produced are unsatisfactory in processing property, and the molded products give bluish turbidity and the detriment of their transparency. As the methacrylic esters, for example, an alkyl ester group with such the alkyl radical as methyl, ethyl, butyl, octyl, isobutyl, ethyl-hexyl, lauryl, cetyl and other alkyls and an ester group including cyclohexyl, hydroxyalkyl, glycidyl and other esters are used, either singly or in combination with two or more kinds of them.

The vinyl aromatic hydrocarbons are used in the rate of 10–60% of the total monomers. When they are used outside this specified amount, the compositions produced are poor in processing property, and the molded products give bluish turbidity. As the vinyl aromatic hydrocarbons, for example, styrene, alpha-methylstyrene, vinyl toluene and their nucleus substituted derivatives are used either singly or in combination with two or more kinds of them.

The acrylonitrile series monomers are used in the rate of 2–30% of the total monomers. When they are used in amounts less than 2%, the mutual solubilities between the graft-polymers and vinyl chloride resins are insufficient. Consequently, the processing property is not improved. When 30% is exceeded, the compositions produced are poor in heat stability, and the molded products give yellowish turbidity and the detriment of their transparency. As the acrylonitrile series monomers, for example, acrylonitrile and methacrylonitrile are mentioned. These monomers are used either singly or in combination with two or more of them.

The ratio of components of the monomers should be strictly observed in using these monomers. These facts are evident from the data of the experiments listed in the following Table 3.

TABLE 3

| Experiment number | Monomer components (percent) | | | Transparency | | | | Roll temperature (° C.) | Gelation time (min.) | Heat stability (min.) |
|---|---|---|---|---|---|---|---|---|---|---|
| | Methyl methacrylate | Styrene | Acrylonitrile | Naked eye | Coefficient of transmission of of light ray (percent) | | | | | |
| | | | | | 400 mμ | 500 mμ | 600 mμ | | | |
| This invention: | | | | | | | | | | |
| 10 | 30 | 60 | 10 | Transparent | 48 | 75 | 81 | 135 | 1.5 | 75 |
| 11 | 30 | 50 | 20 | do | 46 | 71 | 75 | 140 | 1.8 | 70 |
| 12 | 30 | 40 | 30 | do | 46 | 60.5 | 67 | 140 | 2.5 | 65 |
| 13 | 38 | 60 | 2 | do | 50 | 65 | 71 | 135 | 2.0 | 80 |
| 14 | 63 | 35 | 2 | do | 52 | 70.5 | 79 | 140 | 2.5 | 80 |
| 15 | 85 | 13 | 2 | do | 49 | 63 | 70 | 145 | 3.6 | 80 |
| 16 | 85 | 10 | 5 | do | 42 | 61 | 72 | 145 | 2.5 | 75 |
| 17 | 70 | 10 | 20 | do | 46 | 63 | 70 | 140 | 3.0 | 70 |
| 18 | 60 | 10 | 30 | do | 45 | 63 | 69 | 140 | 2.7 | 70 |
| 19 | 72 | 20 | 8 | do | 56 | 69 | 75 | 140 | 2.4 | 75 |
| 20 | 50 | 40 | 10 | do | 52 | 70 | 77 | 140 | 1.5 | 75 |
| 21 | 45 | 30 | 25 | do | 40.5 | 60 | 66 | 140 | 1.0 | 70 |
| Contrast: | | | | | | | | | | |
| 22 | 25 | 50 | 25 | Bluish | 30.5 | 44 | 55.5 | 150 | 3.5 | 60 |
| 23 | 35 | 30 | 35 | Yellowish | 21.5 | 39 | 44 | 140 | 3.2 | 40 |
| 24 | 33 | 65 | 2 | Bluish opaque | 3.5 | 23 | 28 | 135 | 2.0 | 80 |
| 25 | 53 | 12 | 35 | Yellowish | 0.5 | 5 | 18 | 140 | 5.3 | 40 |
| 26 | 65 | 35 | 0 | Bluish | 19 | 37.5 | 53 | 155 | 8.5 | 75 |
| 27 | 68 | 7 | 25 | Yellowish | 5.2 | 38.5 | 42.5 | 145 | 3.7 | 60 |
| 28 | 85 | 7 | 8 | Bluish | 31.5 | 57 | 62.5 | 145 | 4.8 | 70 |
| 29 | 90 | 8 | 2 | do | 45 | 58 | 65 | 145 | 6.5 | 75 |

NOTE

Tests were conducted of the sheets obtained by roll-kneading compositions consisting of 5 parts of vinyl chloride resin (average polymerization degree 1000) and 5 parts of graft polymers obtained by graft-polymerizing with a latex containing 5 parts of styrene-butadiene rubber (styrene content 23.5%) 100 parts of monomers in the ratio of components in Table 3 with an addition of 3 parts of dialkyl tin mercaptide and 1 part of butyl stearate.

Furthermore, when the aforementioned basic three ingredients are used in the specified amount, the comonomers of other kinds copolymerizable with these three ingredients may be jointly used singly or in combination The vinyl chloride series resins and the graft polymers are mixed in the ratio of more than 60 parts vinyl chloride resins and less than 40 parts graft polymers. As evident from the examples below, the vinyl chloride resin can be present in an amount of 65 to 99.5 parts by weight and the graft polymer can be present in an amount of 0.5 to 35 parts by weight. When the vinyl chloride series resins are used in amounts smaller than 60 parts, the excellent properties intrinsic to the vinyl chloride series resins will be lost. This fact is evident from the results of the experiments listed in the following Table 5.

TABLE 5

| Experiment number | Vinyl chloride resin (parts) | Graft polymer (parts) | Transparency Naked eye | Coefficient of transmission of light ray (600 mµ, percent) | Roll temperature (° C.) | Gelation time (min.) | Tensile strength (kg./cm.²) | Elongation (percent) | Impact strength (kg. cm./cm.²) |
|---|---|---|---|---|---|---|---|---|---|
| 36 | 100 | 0 | Transparent | 79 | 165 | 15 | 617 | 140 | 3.3 |
| 37 | 99.5 | 0.5 | do | 79 | 160 | 12 | 617 | 145 | 3.0 |
| 38 | 98 | 2 | do | 80 | 140 | 2.5 | 619 | 152 | 2.9 |
| 39 | 90 | 10 | do | 76 | 140 | 1.5 | 625 | 160 | 2.4 |
| 40 | 65 | 35 | do | 70 | 140 | 1.5 | 610 | 131 | 2.0 |
| 41 | 60 | 40 | Slightly yellowish | 68 | 140 | 1.5 | 600 | 118 | 2.0 |
| 42 | 50 | 50 | Yellowish | 62 | (*) | 1.5 | 594 | 20 | 1.8 | with two or more kinds of them. In this instance, amounts of comonomers used may be less than 20% of the total amount of the monomers. Such comonomers may include: alkyl acrylates (e.g., methyl acrylate, ethyl acrylate, butyl acrylate, ethyl hexyl acrylate), vinyl esters (e.g., vinyl acetate, vinyl propionate), mono or di (methyl, ethyl, butyl, octyl and other) esters of maleic acid and fumaric acid, monomers having two or more double bonds in one molecule (e.g., divinyl benzene, ethylene glycol dimethacrylate, diethylene glycol dimethacrylate, polyethylene glycol dimethacrylate), etc. In this way, the fluidity or the hardness will be greatly improved in the compositions obtained, and their molded products are excellent in their surface condition. These facts are evident from the results of the experiments listed in the following Table 4.

NOTES (1) The experiment Nos. 36, 41 and 42 provide contrasts.

(2) In the test condition of * mark, all of the sheets obtained at any temperature were broken.

(3) A composition of vinyl chloride resin (average polymerization degree 1000) and the graft-polymer obtained by graft-polymerizing 100 parts of monomer in the rate of methyl methacrylate 50%, styrene 40% and acrylonitrile 10% with a latex containing 5 parts of styrene-butadiene rubber (containing 23.5% styrene) was tested.

(4) Tensile strength (at break): JIS–K6745. kg./cm.², at 20° C. (The same applies hereinafter.)

(5) Elongation (at break): JIS–K6745. Percent at 20° C. (The same applies hereinafter.)

TABLE 4

| Experiment number | Monomer component (percent) | | | | Transparency (naked eye) | Roll temperature (° C.) | Gelation time (min.) | Heat stability (min.) | Fluidizing temperature (° C.) | Hardness |
|---|---|---|---|---|---|---|---|---|---|---|
| | Methyl methacrylate | Styrene | Acrylonitrile | Comonomer | | | | | | |
| 30 | 50 | 40 | 10 | | Transparent | 140 | 1.5 | 75 | 183 | 115 |
| 31 | 45 | 35 | 10 | VAc 10 | do | 135 | 0.8 | 75 | 180 | 114 |
| 32 | 42 | 35 | 8 | VAc 10, BA 5 | do | 135 | 0.2 | 70 | 178 | 113 |
| 33 | 50 | 40 | 5 | DBF 5 | do | 135 | 1.0 | 75 | 181 | 115 |
| 34 | 50 | 40 | 9 | EGD 2 | do | 147.5 | 2.0 | 80 | 186 | 118 |
| 35 | Vinyl chloride resin | | | | Transparent | 165 | 15 | 75 | 191 | 115 |

NOTES (1) Experiment No. 35 is contrast.

(2) These experiments were carried out in the same way as in the experiments of Table 3 except for the alteration of the monomer components.

(3) Fluidizing temperature: The temperature (° C.) at which the flow rate of $6 \times 10^{-3}$ cc./sec. is indicated on the Koka type flow tester when a pellet taken from the rolled sheet is raised in temperature at 6° C./min. with a load of 60 kg./cm.² imposed, and is extruded from a 1 mmφ x 2 mm. nozzle. (The same applies hereinafter.)

(4) Hardness: Measured by the Rockwell hardness tester, on the R scale with 60 kg. load from ½ inch dia. steel ball. (The same applies hereinafter.)

(5) VAc: Vinyl acetate (6) BA: Butyl acrylate (7) DBF: Dibutyl fumarate (8) EGD: Ethylene glycol dimethacrylate (6) Impact strength: ASTM–D256. Izod, at 20° C., with notch (kg. cm./cm.²). (The same applies hereinafter.)

The method of mixing the vinyl chloride seres resins with the graft-polymers does not subject to restrictions. For example, both parties may be prepared individually in the form of powder or latex, and are mixed together; or at first, one of the parties is prepared, and in its presence, the other may be polymerized.

The compositions obtained in this way may be molded with or without the addition of the stabilizer, lubricant, plasticizer, coloring agent, etc., which are usually used in forming the vinyl chloride resins. Moreover, the impact strength modifiers may be added as required.

In the compositions of this invention, as excellent processing property is achieved without losing the excellent physical and chemical properties intrinsic to the vinyl chloride resins; accordingly, their molded products are satisfactory in their surface condition.

In the following, embodiments of this invention are provided.

EXAMPLE 1

A styrene-butadiene rubber latex may be manufactured by the well-known method.

| Ingredients: | Amount in parts by weight |
|---|---|
| Butadiene-1.3 | 75 |
| Styrene | 25 |
| Oleic acid | 3.0 |
| Caustic soda | 0.04 |
| Potassium chloride | 0.55 |
| Sodium ethylene diamine tetra-acetate | 0.02 |
| Ferrous sulfate | 0.005 |
| Sodium sulfoxylate formaldehyde | 0.1 |
| Diisopropyl benzene hydroperoxide | 0.1 |
| Tertiary dodecyl mercaptan | 0.2 |
| Water | 150 |

The raw materials mentioned above were charged in a pressure resistant polymerizer equipped with an agitator, and there carried out emulsion polymerization with stirring at 5° C. for 39 hours, yielding the rubber latex.

Successively, the graft polymerization was carried out in the following manner: In a polymerizer equipped with an agitator, were put into the aforementioned latex containing 5 parts of styrene-butadiene rubber, 1.5 parts of sodium oleate dissolved beforehand in water and 0.5 part of ammonium peroxysulfate, and water was further added to the total amount of 210 parts. The liquid temperature was raised to 55° C. while it is being stirred. To this liquid, were added in 6 hours 100 parts of monomers in the rate of 45% methyl methacrylate, 43% styrene and 12% acrylonitrile. After adding them, the stirring process was continued for 1.5 hours, while keeping the liquid temperature at 55° C. The latex obtained in this way was coagulated with hydrochloric acid, filtered, water-rinsed and dried, yielding 101 parts of the graft polymer.

With the mixture of 5 parts of this graft polymer and 95 parts of a vinyl chloride resin (average polymerization degree 1000) were mixed 3 parts of dialkyl tin mercaptide and 1 part of butyl stearate, and the mixture was subjected to the roll kneading. This composition was easily wound on a roll at 140° C., and a transparent, smooth sheet was obtained. This sheet did not break itself when bent to an angle of 180°.

On the other hand, the vinyl chloride resin singly was formed in the same way. In this instance, much time was taken to wind it on the roll at 140° C.; and the sheet obtained did break without exception when bent to 180°. To obtain a sheet with satisfactory strength, a roll temperature of 165° C. was needed.

Both sheets obtained in the way mentioned above were pressed at 170° C. with a pressure of 200 kg./cm.$^2$ to have the test pieces. The results of tests conducted on them are given in Table 6.

TABLE 6

| Items measured | This invention | Polyvinyl chloride |
|---|---|---|
| Tensile strength (kg./cm.$^2$) | 622 | 617 |
| Elongation (percent) | 150 | 140 |
| Impact strength (kg. cm./cm.$^2$) | 2.8 | 3.3 |
| Hardness (Rockwell R) | 115 | 115 |
| Heat distortion temperature (° C.) | 63.9 | 63.5 |
| Coefficient of transmission of light ray (600 mμ, percent) | 78.0 | 72.5 |
| Fluidizing temperature (° C.) | 181 | 191 |
| Heat stability (min.) | 75 | 75 |

NOTES

Heat distortion temperature: ASTM-D648, 18.6 kg. load, ° C. (The same applies hereinafter.)

In the composition prepared by the method of this invention, the excellent properties intrinsic to vinyl chloride were not lost, and the processing property was greatly improved.

EXAMPLE 2

A polybutadiene latex was produced in the same way as in case of Example 1 excepting that the recipe for the rubber latex was altered to exclude styrene and use butadiene-1,3 in 100 parts.

With this latex containing 7 parts of polybutadiene, was graft-polymerized in the same way as in case of Example 1, 100 parts of monomers in the rate of 65% methyl methacrylate, 30% styrene and 5% acrylonitrile.

With a mixture of 5 parts of the graft polymer obtained in this way, 82 parts of a vinyl chloride resin (average polymerization degree 800) and, as the impact strength modifier, 13 parts of a copolymer (Kane Ace B-12, manufactured by Kanegafuchi Kagaku-Kogyo Kabushiki-Kaisha) of methyl methacrylate-butadiene-styrene (30:32:38), were mixed 3 parts of dialkyl tin mercaptide and 1 part of butyl stearate. The mixture was subjected to roll kneading at 135° C., and a transparent and smooth sheet was obtained. This sheet did not break itself when bent to an angle of 180°.

However, with the contrast composition in which the graft polymer was not used, a roll temperature of 150° C. was needed to obtain a sheet with satisfactory strength.

Both sheets were formed into test pieces at 170° under 200 kg./cm.$^2$. The impact strength was measured on them, and the following results were obtained:

| | Kg. cm./cm.$^2$ |
|---|---|
| The composition of this invention | 71 |
| The contrast composition | 60 |

EXAMPLE 3

Compositions of 90 parts of vinyl chloride acetate copolymer (containing vinyl acetate 4%, average polymerization degree 850) with and without an addition of 10 parts of the graft polymer obtained as in case of Example 2 were subjected to tests in the same way as in case of Example 1. The resluts are given in Table 7.

TABLE 7

| Items measured | This invention | Vinyl chloride acetate copolymer |
|---|---|---|
| Tensile strength (kg./cm.$^2$) | 620 | 605 |
| Elongation (percent) | 158 | 145 |
| Impact strength (kg. cm./cm.$^2$) | 2.6 | 3.6 |
| Hardness (Rockwell R) | 112 | 113 |
| Coefficient of transmission of light ray (600 mμ, percent) | 83 | 86 |
| Fluidizing temperature (° C.) | 154 | 159 |
| Heat stability (min.) | 60 | 60 |
| Roll temperature (° C.) | 135 | 155 |

What is claimed is:
1. Composition comprising
   (A) 65 to 99.5 parts by weight vinyl chloride series resins,
   (B) and 0.5 to 35 parts by weight graft polymers obtained by graft polymerizing
      (1) 1 to less than 10 parts by weight of a rubber polymer selected from the group consisting of a homopolymer of butadiene and copolymers of butadiene with a monomer selected from the group consisting of styrene, methyl methacrylate and acrylonitrile,
      (2) 100 parts by weight monomers consisting essentially of
         (a) 30 to 85 weight percent methacrylic esters,
         (b) 10 to 60 weight percent vinyl aromatic hydrocarbons, and
         (c) 2 to 30 weight percent acrylonitrile series monomers.
2. Composition of claim 1, wherein said vinyl chloride series resins are selected from the group consisting of polyvinyl chloride, copolymer of more than 80 weight percent vinyl chloride and one or more comonomers, and mixtures thereof.

3. Composition of claim 1, wherein said methacrylic esters have an alkyl radical selected from the group consisting of methyl, ethyl, butyl, octyl, isobutyl, ethyl-hexyl, lauryl, cetyl, and mixtures thereof; and an ester selected from the group consisting of cyclohexyl, hydroxylalkyl, glycidyl, and mixtures thereof.

4. Composition of claim 1, wherein said vinyl aromatic hydrocarbons are selected from the group consisting of styrene, alphamethylstyrene, vinyl toluene and their nucleus substituted derivatives and mixtures thereof.

5. Composition of claim 1, wherein said acrylonitrile series monomers are selected from the group consisting of acrylonitrile, methacrylonitrile, and mixtures thereof.

6. Composition of claim 1, wherein said butadiene is copolymerized with styrene.

7. Composition comprising
   (A) 65 to 99.5 parts by weight vinyl chloride series resins,
   (B) and 0.5 to 35 parts by weight graft polymers obtained by graft polymerizing
      (1) 1 to less than 10 parts by weight of a rubber polymer selected from the group consisting of a homopolymer of butadiene and copolymers of butadiene with a monomer selected from the group consisting of styrene, methyl methacrylate and acrylonitrile,
      (2) 100 parts by weight monomers consisting essentially of
         (a) more than 80 weight percent monomers comprising
            (1) 10 to 60 weight percent vinyl aromatic hydrocarbons,
            (2) 30 to 85 weight percent methacrylic esters, and
            (3) 2 to 30 weight percent acylonitrile series monomers, and
         (b) less than 20 weight percent comonomers of other kinds.

8. Composition of claim 7, wherein said comonomers of other kinds are selected from the group consisting of alkyl acrylates, vinyl esters, monoesters of maleic acid, monoesters of fumaric acid, diesters of maleic acid, diesters of fumaric acid, monomers having two or more double bonds in one molecule, and mixtures thereof.

9. Composition of claim 7, wherein said vinyl chloride series resins are selected from the group consisting of polyvinyl chloride, copolymer of more than 80 weight percent vinyl chloride and one or more comonomers, and mixtures thereof.

10. Composition of claim 7, wherein said methacrylic esters have an alkyl radical selected from the group consisting of methyl, ethyl, butyl, octyl, isobutyl, ethyl-hexyl, lauryl, cetyl, and mixtures thereof; and an ester selected from the group consisting of cyclohexyl, hydroxyalkyl, glycidyl, and mixtures thereof.

11. Composition of claim 7, wherein said vinyl aromatic hydrocarbons are selected from the group consisting of styrene, alpha methylstyrene, vinyl toluene and their nucleus substituted derivatives and mixtures thereof.

12. Composition of claim 7, wherein said acrylonitrile series monomers are selected from the group consisting of acrylonitrile, methacrylonitrile, and mixtures thereof.

13. Composition of claim 7, wherein said butadiene is copolymerized with styrene.

References Cited

UNITED STATES PATENTS

| | | | |
|---|---|---|---|
| 3,287,443 | 11/1966 | Saito et al. | 260—876 |
| 3,288,886 | 11/1966 | Himei et al. | 260—876 |
| 3,336,417 | 8/1967 | Sakuma et al. | 260—876 X |

SAMUEL H. BLECH, Primary Examiner

U.S. Cl. X.R.

260—23.7 M, 29.7 UP, 836, 880 R